Figure 1:
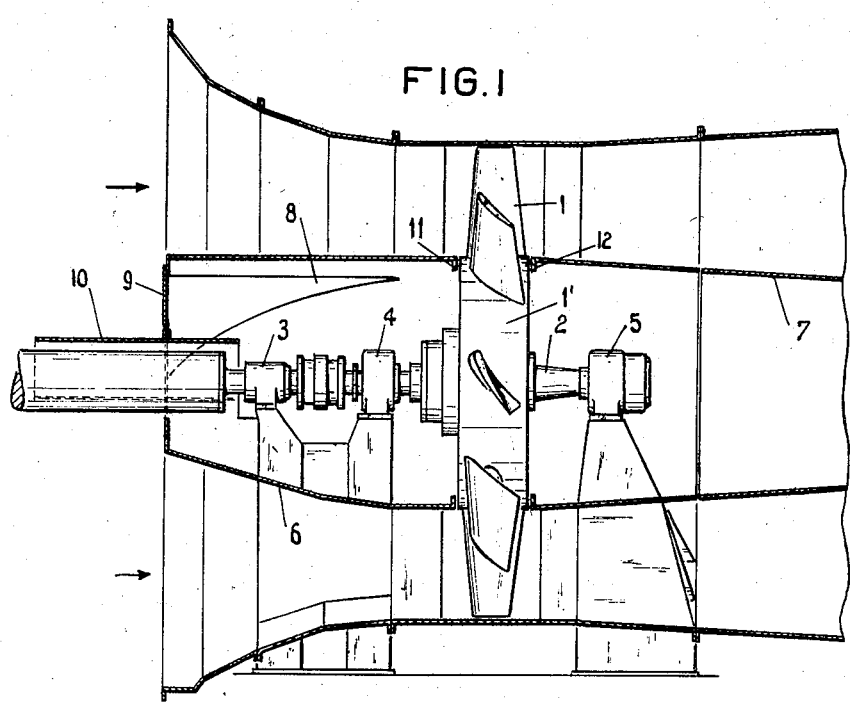

July 22, 1958  J. C. BUSQUET  2,844,304
AXIAL FLOW FANS OR AXIAL FLOW PUMPS
Filed Oct. 3, 1956

INVENTOR
JAN C. BUSQUET
BY

United States Patent Office 2,844,304
Patented July 22, 1958

2,844,304
AXIAL FLOW FANS OR AXIAL FLOW PUMPS

Jan C. Busquet, Hengelo (O.), Netherlands, assignor to Koninklijke Machinefabriek Gebr. Stork & Co. N. V., Hengelo (O.), Netherlands Application October 3, 1956, Serial No. 613,659

Claims priority, application Netherlands October 18, 1955

2 Claims. (Cl. 230—120)

The invention relates to an axial flow impeller such as a fan or pump, having at least at the suction side of the impeller a stationary hollow, conical body contiguous with the circumference of the hub of the impeller and facing the impeller with its wider end and containing one or more bearings for the impeller shaft. With fans and pumps of this type, which may have very large dimensions and are used e. g. in mines and the like, the bearings are difficult to reach and are accessible for inspection, servicing and replacement only after stopping the impeller and removing at least part of the hollow body of the hub.

The invention has for its object to obviate the foregoing difficulty and to this end the conical body located at the suction side of the impeller is widened on part of its circumference by a hood having at the front face of the conical body a removable door. With this construction of the conical body, the inflow to the impeller is not disturbed and access is obtained to the interior of the conical body, and, therefore, to the bearings at the suction side of the impeller.

Figure 2:
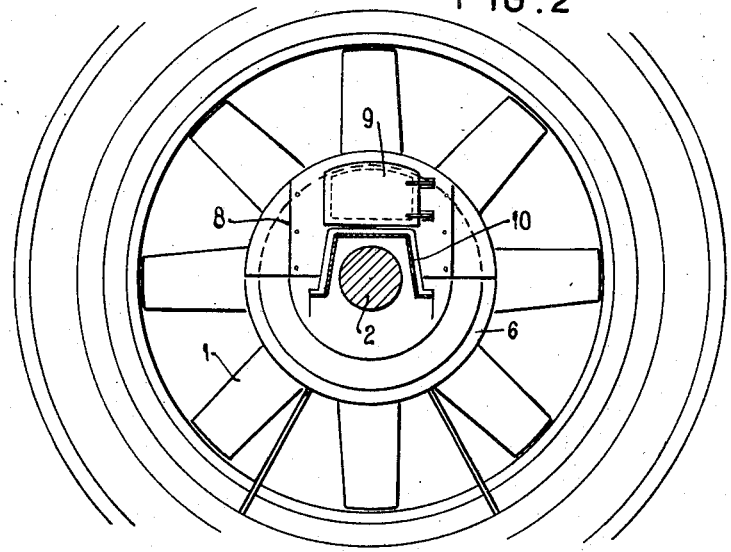

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

Fig. 1 is a longitudinal cross sectional view of the fan casing with a side view in elevation of the impeller, and Fig. 2 is a front view in elevation of the fan casing and impeller.

The shaft 2 of the impeller 1 is supported at the suction side in bearings 3, 4 and at the pressure side in a bearing 5. The bearings 3, 4 are located in a conical body 6 of sheet metal contiguous with the circumference of the hub 1', of the impeller, and the bearing 5 is mounted in a hollow conical body 7. The bodies 6 and 7 extend to close juxtaposition relative to the front and rear faces, respectively, of the hub 1' and preferably the adjacent edges of said bodies have inturned flanges 11 and 12, respectively, which are closely spaced relative to the hub faces to effectively preclude air stream passages therebetween.

Mounted on the body 6 is a hood 8 which at its front wall is provided with an inspection door 9 giving access to the interior of the hollow body 6 in order to reach the bearings 3 and 4. The shaft 2 at the inlet of the fan casing is partly surrounded by a protecting cover 10 secured to the body 6 so that during operation of the fan the bearings 3 and 4 may be inspected without danger. By placing a ladder against the cover 10 one may easily open the door 9 and enter the body 6 for inspecting the bearings 3 and 4.

What I claim is:

1. An axial flow impeller apparatus comprising an annular casing having an inlet end, bearings in said casing, a shaft journaled in said bearings and extending longitudinally of said casing, an impeller including a hub mounted on said shaft and blades extending from said hub, a stationary hollow body in said casing at the suction side of said impeller, said body surrounding said shaft and extending substantially from the inlet end of said casing to the impeller hub and being substantially contiguous with the circumference of said hub with said impeller blades extending beyond the circumference of said body, said hollow body including a front wall and enclosing the bearings on the inlet side of said impeller, and an inspection door in said body front wall and giving access to said bearings for inspecting and servicing said bearings.

2. An axial flow impeller apparatus according to claim 1 wherein the front wall of said body has an opening through which said shaft extends and a protective covering surrounding at least the upper portion of said shaft and secured to said front wall.

References Cited in the file of this patent

UNITED STATES PATENTS

| 1,961,315 | Waseige | June 5, 1934 |
| 2,153,576 | Kurth et al. | Apr. 11, 1939 |
| 2,297,269 | Wendt et al. | Sept. 29, 1942 |